United States Patent
Felber et al.

(10) Patent No.: US 9,855,825 B2
(45) Date of Patent: Jan. 2, 2018

(54) USE OF A FILTER ELEMENT FOR THE ADSORPTION OF HYDROCARBONS

(71) Applicant: Carl Freudenberg KG, Weinheim (DE)

(72) Inventors: Uwe Felber, Abtsteinach (DE); Thomas Stoesser, Viernheim (DE); Ulrich Stahl, Laudenbach (DE); Thomas Wolff, Muenchberg (DE)

(73) Assignee: CARL FREUDENBERG KG, Weinheim (DE)

( * ) Notice: Subject to any disclaimer, the term of this patent is extended or adjusted under 35 U.S.C. 154(b) by 247 days.

(21) Appl. No.: 14/715,651

(22) Filed: May 19, 2015

(65) Prior Publication Data
US 2015/0328962 A1 Nov. 19, 2015

(30) Foreign Application Priority Data
May 19, 2014 (DE) .......................... 10 2014 007 215

(51) Int. Cl.
*B01D 53/02* (2006.01)
*B60H 3/06* (2006.01)
(Continued)

(52) U.S. Cl.
CPC ....... *B60H 3/0658* (2013.01); *B01D 46/2429* (2013.01); *B01D 53/04* (2013.01);
(Continued)

(58) Field of Classification Search
CPC ........ B01D 2256/102; B01D 2256/304; B01D 2256/3425; B01D 2258/06;
(Continued)

(56) References Cited

U.S. PATENT DOCUMENTS 5,356,852 A * 10/1994 DeLiso .................... B01J 20/20
428/116
5,376,609 A * 12/1994 Guile ....................... B01J 20/20
502/401
(Continued)

FOREIGN PATENT DOCUMENTS

DE          10104882 B4      8/2002
DE          10150062 B4      2/2003
(Continued)

OTHER PUBLICATIONS

K.P. Gadkaree, "Carbon Honeycomb Structures for Adsorption Applications", Carbon, vol. 36, issue 7-8, pp. 981-989, Dec. 31, 1998.
(Continued)

*Primary Examiner* — Christopher P Jones
(74) *Attorney, Agent, or Firm* — Leydig, Voigt & Mayer, Ltd.

(57) ABSTRACT

The use of a filter element with a body which has material which is suitable for adsorption of gases and vapors, the body being in the form of a honeycomb body, is, with regard to the object of supplying a substantially closed chamber with filtered inlet air in trouble-free fashion, the inlet air being virtually completely freed from pollutants which are present in the form of aerosols, gases, liquid droplets or solid particles, and a filter element of simple construction being used, wherein the filter element is used for supplying filtered inlet air to an at least partially closed-off chamber, the inlet air being freed from pollutants which are present in the form of aerosols, gases, liquid droplets or solid particles.

17 Claims, 3 Drawing Sheets

(51) Int. Cl.
  *B01D 46/24* (2006.01)
  *B01D 53/04* (2006.01)
  *B01J 20/28* (2006.01)
  *B01J 20/20* (2006.01)

(52) U.S. Cl.
  CPC ......... *B01J 20/20* (2013.01); *B01J 20/28045* (2013.01); *B01D 2253/102* (2013.01); *B01D 2253/304* (2013.01); *B01D 2253/3425* (2013.01); *B01D 2258/06* (2013.01); *B01D 2259/4508* (2013.01); *B01D 2259/4566* (2013.01); *B60H 2003/0691* (2013.01)

(58) Field of Classification Search
  CPC .... B01D 2259/4508; B01D 2259/4566; B01D 46/2429; B01D 53/04; B01J 20/20; B01J 20/28045; B60H 2003/0691; B60H 2003/0658
  See application file for complete search history.

(56) References Cited

U.S. PATENT DOCUMENTS

| | | | | |
|---|---|---|---|---|
| 5,451,554 A * | 9/1995 | Guile | ............ | B01J 20/20 428/408 |
| 5,543,096 A * | 8/1996 | Wu | ............ | C04B 35/16 264/234 |
| 5,658,372 A | 8/1997 | Gadkaree | | |
| 5,759,496 A * | 6/1998 | Hickman | ............ | B01D 53/0462 422/171 |
| 5,820,967 A * | 10/1998 | Gadkaree | ............ | B01J 20/20 264/176.1 |
| 6,097,011 A * | 8/2000 | Gadkaree | ............ | B01D 53/02 219/202 |
| 6,136,749 A * | 10/2000 | Gadkaree | ............ | B01D 53/8665 502/180 |
| 6,299,958 B1 * | 10/2001 | St. Julien | ............ | B28B 11/003 156/197 |
| 2001/0011539 A1 * | 8/2001 | Ito | ............ | F02M 25/089 123/518 |
| 2002/0103081 A1 | 8/2002 | Wolff | | |
| 2003/0019361 A1 * | 1/2003 | Wolff | ............ | B01D 39/2062 96/134 |
| 2003/0178357 A1 | 9/2003 | Wolff et al. | | |
| 2004/0118747 A1 * | 6/2004 | Cutler | ............ | B01D 53/0415 208/208 R |
| 2004/0123573 A1 * | 7/2004 | Ichikawa | ............ | B01D 46/2451 55/523 |
| 2005/0066817 A1 * | 3/2005 | Wolff | ............ | B01D 53/02 96/108 |
| 2006/0063663 A1 | 3/2006 | Wolff | | |
| 2006/0142154 A1 | 6/2006 | Wolff | | |
| 2006/0168908 A1 * | 8/2006 | Ichikawa | ............ | B01D 39/12 52/793.1 |
| 2007/0265161 A1 * | 11/2007 | Gadkaree | ............ | B01D 53/02 502/417 |
| 2009/0173050 A1 | 7/2009 | Travitzky et al. | | |
| 2011/0209619 A1 | 9/2011 | Lazarevic et al. | | |
| 2014/0013941 A1 | 1/2014 | Stinzendoerfer et al. | | |

FOREIGN PATENT DOCUMENTS

| | | |
|---|---|---|
| DE | 10213016 B4 | 10/2003 |
| DE | 102004039343 B4 | 3/2005 |
| DE | 102005032345 B4 | 2/2006 |
| DE | 102004063434 B4 | 7/2006 |
| DE | 102013011457 A1 | 1/2014 |
| EP | 1481718 A1 | 12/2004 |
| EP | 1741687 A1 | 1/2007 |
| EP | 2409751 A1 | 1/2012 |
| WO | WO 2010049052 A1 | 5/2010 |

OTHER PUBLICATIONS

Shen Boxiong, "Air Pollution Control Project", Chemical Industry Press, pp. 82-83, Aug. 31, 2007.

Chinese Office Action, Chinese patent office, dated Sep. 15, 2017.

* cited by examiner ates. The features and advantages of various embodiments of the present invention will become apparent by reading the following detailed description with reference to the attached drawings which illustrate the following:

USE OF A FILTER ELEMENT FOR THE ADSORPTION OF HYDROCARBONS

CROSS-REFERENCE TO RELATED APPLICATIONS

Priority is claimed to German Patent Application No. DE 10 2014 007 215.0, filed on May 19, 2014, the entire disclosure of which is hereby incorporated by reference herein.

FIELD

The invention relates to the use of a filter element suitable for adsorption of gases and vapors.

BACKGROUND

WO 2010/049 052 A1 discloses a filter element which is in the form of a so-called combination filter. A filter element of said type filters particles and adsorbs gases. Filter elements of this type can be used for keeping passenger compartments substantially free from hazardous pollutants.

Cabins of vehicles must to a great extent be kept reliably free from substances which are hazardous to health, in particular gases and vapors.

Against this background, it is proposed in DE 10 2013 011 457 A1 that activated carbon in bulk material or free-flowing form be used. It is proposed in particular that activated carbon in granulate form be used.

The use of activated carbon in this form is already known from the combination filters already mentioned above, which additionally exhibit a corrugated structure.

Moreover, the teaching of DE 10 2013 011 457 A1 concerns the embedding of activated carbon into foams by means of adhesives. It is a disadvantage here that activated carbon surface area is prevented, by the adhesive, from serving as adsorption surface. The teaching also concerns the use of activated carbon in bulk material form.

Against this background, DE 101 04 882 B4 has already disclosed an activated carbon molded body which has a honeycomb structure. The activated carbon molded body is manufactured by extrusion from a mixture of activated carbon and further substances, and is used as an absorption filter.

An activated carbon molded body which has a carbonized resin is known from DE 102 13 016 B4.

A further filter element which has an activated carbon molded body with a honeycomb structure is known from DE 101 50 062 B4.

DE 10 2004 063 434 B4 discloses a further activated carbon molded body with ducts.

DE 10 2005 032 345 B4 has disclosed a molded body with an inorganic support structure, in which adsorbents are embedded into the support structure.

DE 10 2004 039 343 B4 presents a further activated carbon molded body with high adsorption capability.

SUMMARY

An aspect of the invention provides a method of supplying filtered inlet air to an at least partially closed-off chamber, the method comprising: contacting inlet air with a filter element, thereby freeing the inlet air from a pollutant comprising an aerosol, gas, liquid droplet, solid particle, or mixture thereof, to obtain a filtered air; supplying the filtered air to an at least partially closed-off chamber, wherein the filter element comprises a honeycomb body, the honeycomb body comprising a material suitable for adsorbing a gas.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
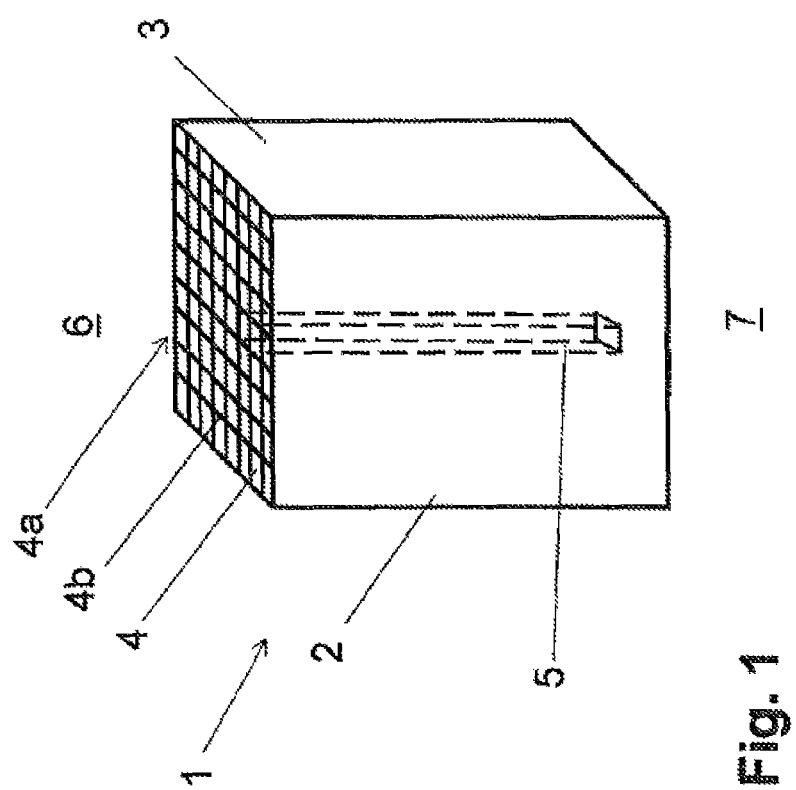
FIG. 1 shows a filter element which has a cuboidal honeycomb body composed of activated carbon, wherein the honeycombs comprise substantially rectangular openings which issue into ducts which run through the honeycomb body.

An aspect of the invention provides a substantially closed chamber with filtered inlet air in trouble-free fashion, the inlet air being virtually completely freed from pollutants which are present in the form of aerosols, gases, liquid droplets or solid particles, and a filter element of simple construction being used.

It has been identified according to an aspect of the invention that a honeycomb body makes it possible for a filter element to be made very compact in terms of construction. It has also been identified that a honeycomb body effects a small pressure loss between inflow side and outflow side of the filter element, and thus poses few problems in terms of apparatus. Surprisingly, it has been identified that conventionally used filter elements with activated carbon pellets or activated carbon granulate exhibit a relatively high pressure loss compared with a honeycomb body.

It is furthermore surprising that a honeycomb body exhibits good adsorption performance even though it has open ducts and the adsorption itself takes place only owing to contact between the medium to be filtered and the walls of the ducts in the flow direction.

Surprisingly, a honeycomb body having 62 ducts per square centimeter exhibits poor adsorption dynamics in relation to a honeycomb body having 93 ducts per square centimeter. The honeycomb body having 62 ducts per square centimeter duly exhibits a high adsorbed mass and thus high overall adsorption performance, but poor adsorption dynamics.

The adsorption dynamics are characterized by the breadth of a mass transfer zone or by a gradient of a breakthrough curve at a breakthrough of 50%. The honeycomb body having 62 ducts per square centimeter exhibits a gradient which increases earlier and which breaks through earlier. Although the honeycomb body having 93 ducts per square centimeter exhibits lower overall adsorption performance, it exhibits better adsorption dynamics because it breaks through later, but with a steeper gradient and more rapidly. A breakthrough is to be understood to mean the breakthrough of pollutants to the outflow side. A breakthrough of 50% means that 50% of the pollutants flowing in break through to the outflow side.

Through the use according to the invention, at the outflow side of the filter element, a test gas concentration of less than 10 μg/g according to the cyclohexane method in accordance with EN 12941: 1998 is attained in the case of a test duration of 70 minutes measured in accordance with EN 15695-2: 2011.

In this respect, it is possible for a substantially closed chamber to be supplied with filtered inlet air in trouble-free fashion, the inlet air being virtually completely freed from pollutants which are present in the form of aerosols, gases, liquid droplets or solid particles, and a filter element of simple construction being used.

Consequently, the object set out in the introduction is achieved.

It would be possible for the honeycomb body to exhibit very good adsorption dynamics. Accordingly, at the outflow side of the filter element, a test gas concentration of less than 10 μg/g according to the cyclohexane method in accordance with EN 12941: 1998 is attained in the case of a test duration of 70 minutes measured in accordance with EN 15695-2: 2009.

It would be possible for the honeycomb body to be manufactured from activated carbon or have activated carbon. Activated carbon can, in the form of a paste or as part of a paste, be easily extruded to form a honeycomb body.

It would be possible for the activated carbon fraction in the honeycomb body to amount to between 50 and 80 percent by weight. In this way, the honeycomb body has a sufficient amount of activated carbon and is nevertheless mechanically stable.

It would be possible for the honeycomb body to have ducts formed in it, and/or for the honeycomb body to be extended through by ducts, which are fully open. Air to be filtered can flow through the ducts without a significant pressure loss occurring between inflow side and outflow side.

It would be possible for the wall thickness of the duct walls to amount to between 200 micrometers and 400 micrometers. In this way, a honeycomb body with a very large number of ducts is created.

Against this background, it would be possible for the number of ducts in the honeycomb body to amount to between 40 and 100 ducts per square centimeter. This duct density has proven to be particularly advantageous for ensuring low pressure losses with high adsorption dynamics.

It would be possible for the honeycomb body to have 93 ducts per square centimeter, to have a wall thickness of 285 μm, and to have an activated carbon fraction of 65 percent by weight. Specifically, it has been identified that a honeycomb body having 93 ducts per square centimeter and a wall thickness of 240 μm does not provide the desired results. With a wall thickness of 285 μm or even greater wall thicknesses, the dwell time until a breakthrough of 10 ppm occurs is realized. It has been identified that a suitable combination of duct density, wall thickness and activated carbon fraction must be provided in order to achieve the desired results.

A honeycomb body having 62 ducts per square centimeter and an activated carbon fraction of 65% has not provided the desired results. The same is also true of a honeycomb body having 93 ducts per square centimeter and the same activated carbon fraction and a smaller wall thickness. A honeycomb body having 93 ducts per square centimeter, an activated carbon fraction of 65 percent by weight and a wall thickness of 285 μm leads to the required results.

A filter element produced from an optimized honeycomb body mentioned above exhibits a pressure loss of less than 50 Pascal in the presence of an inflow speed of 0.2 m/s.

A filter element having the same outer dimensions and similar adsorption performance but produced with activated carbon in a different form, for example in the form of granulate, in corrugated form, in bulk material form or in foam form, exhibits a pressure loss of greater than 100 Pascal in the presence of an inflow speed of 0.2 m/s.

It would be possible for the chamber to be implemented in installations in the chemical industry, oil industry or gas industry. In these industrial sectors, personnel are often exposed to vapors and pollutants and must be correspondingly protected.

It would be possible for the chamber to be in the form of a cabin of a vehicle. Cabins of vehicles must to a very great extent be reliably kept free from substances which are hazardous to health. This task can be performed very effectively by a filter element of the type described here.

It would be possible for an interior compartment air filter system for the driver's cab of agricultural and work machines, in particular with spraying or spreading apparatuses for plant protectants or fertilizers, to comprise a filter element of the type described here and a housing with an air inlet and an air outlet, in which the filter element sealingly separates the inlet side from the outlet side.

It would be possible for a driver's cab of a vehicle or of a work machine to comprise an interior compartment air filter system. The use of a filter element of the type described here or of an interior compartment air filter system in a driver's cab of a vehicle or of a work machine is also conceivable.

It would be possible for the vehicle to be in the form of an agricultural or forestry vehicle. It would be possible for a filter element of the type described here to be used in a vehicle which is used in the agricultural or forestry industries. Cabs of agricultural or forestry vehicles must to a very great extent be reliably kept free from substances which are hazardous to health, in particular from pesticides. This task can be performed very effectively by a filter element of the type described here.

It would be possible for the vehicle to be used in the construction sector. Construction machines and the persons that operate them are exposed to very high dust levels and can be protected by means of the filter element described here.

It would be possible for the vehicle to be in the form of a passenger motor vehicle, in particular a taxi, or in the form of a utility motor vehicle, in particular a heavy goods vehicle. In both types of vehicle, it is necessary for the driver, and persons to be conveyed, to be protected against pollutants.

It would be possible for the filter element to be in the form of a combination filter which has a particle-filtering filter stage. It is thus also possible for small particles such as flower pollen to be filtered.

It would be possible for the filter element to be in the form of a combination filter which has a dust-filtering filter stage and an aerosol-filtering filter stage. The filter element can thus satisfy category 4, as it is known, and can be used, in accordance with EN 15695, in the agricultural industry.

FIG. 1 shows a filter element comprising a cuboidal body 2 which has material 3 which is suitable for the adsorption of gases and vapors. The body 2 is in the form of a honeycomb body. The honeycombs 4 comprise rectangular openings which issue into ducts 5 which extend through the body 2.

Other geometries are conceivable. The honeycombs 4 are arranged over a cross-sectional area 4a.

Air can flow through the ducts 5 from an inflow side 6 to an outflow side 7, wherein pollutants in the air are adsorbed by the material 3.

The honeycomb body has 93 ducts 5 per square centimeter of cross-sectional area 4a. Said honeycomb body has a wall thickness 4b of 285 µm. Said honeycomb body has an activated carbon fraction of 65 percent by weight.

Figure 3:
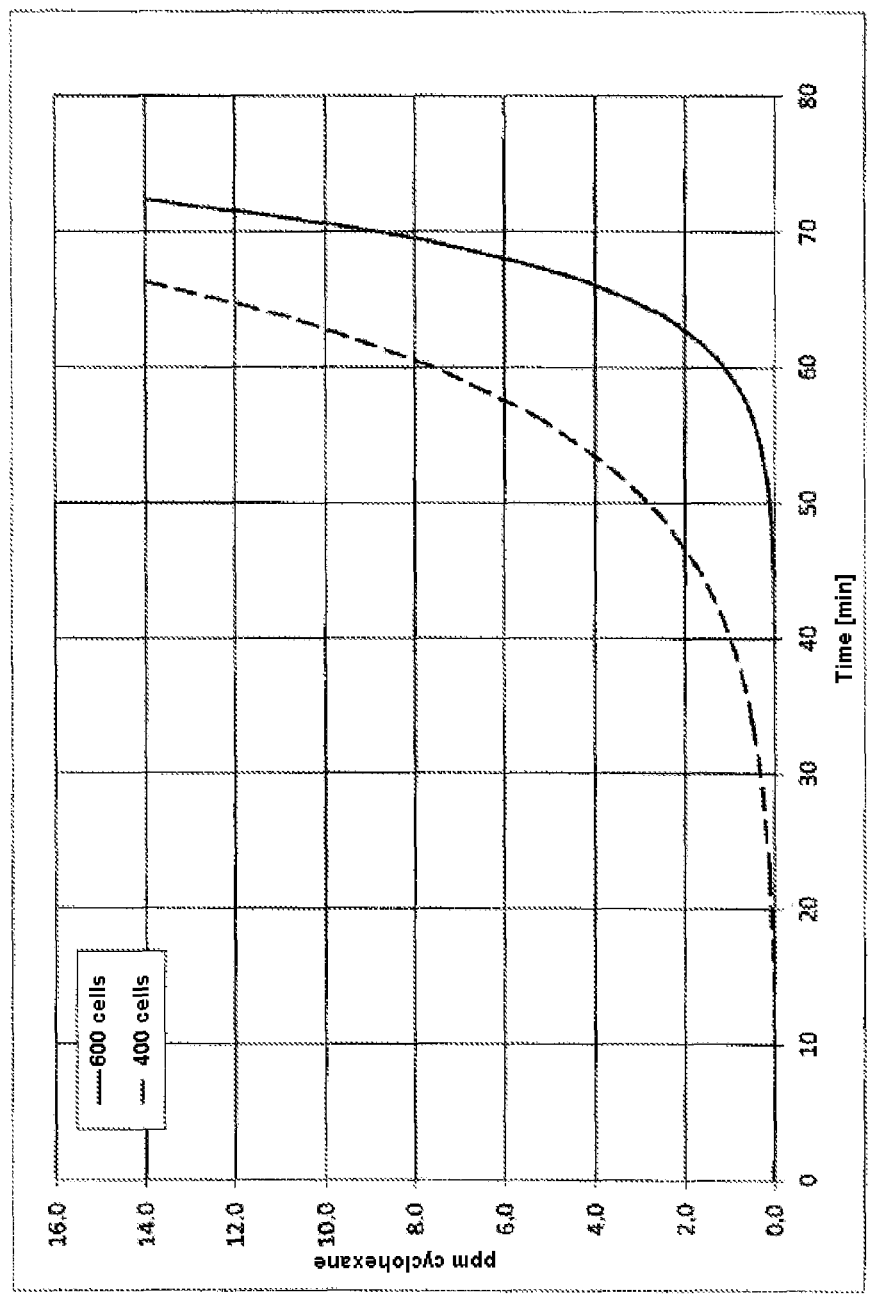
FIG. 3 shows a diagram depicting a breakthrough curve for cyclohexane for a honeycomb body having 93 ducts per square centimeter and with an activated carbon fraction of 65% and a wall thickness of 285 μm in comparison with a breakthrough curve for a honeycomb body having 62 ducts per square centimeter.

The honeycomb body exhibits adsorption performance as illustrated in FIG. 3. The honeycomb body exhibits adsorption dynamics such that, at the outflow side of the filter element, a test gas concentration of less than 10 µg/g according to the cyclohexane method in accordance with EN 12941: 1998 is attained in the case of a test duration of 70 minutes measured in accordance with EN 15695-2: 2009.

The honeycomb body has activated carbon. The activated carbon fraction in the honeycomb body is between 50 and 80 percent by weight. In this respect, the material 3 which is suitable for the adsorption of gases and vapors is in the form of activated carbon.

The honeycomb body has ducts 5 formed in it, and the honeycomb body is extended through by ducts 5, which are fully open. The wall thickness of the duct walls is between 200 micrometers and 400 micrometers. The number of ducts 5 in the honeycomb body amounts to between 40 and 100 ducts per square centimeter.

Through suitable selection of the duct density, of the activated carbon fraction and of the resulting open cross-sectional area, which is defined by the wall thickness, it is possible to achieve the optimum with regard to adsorption dynamics with, at the same time, a back pressure which is not excessively high.

Figure 2:
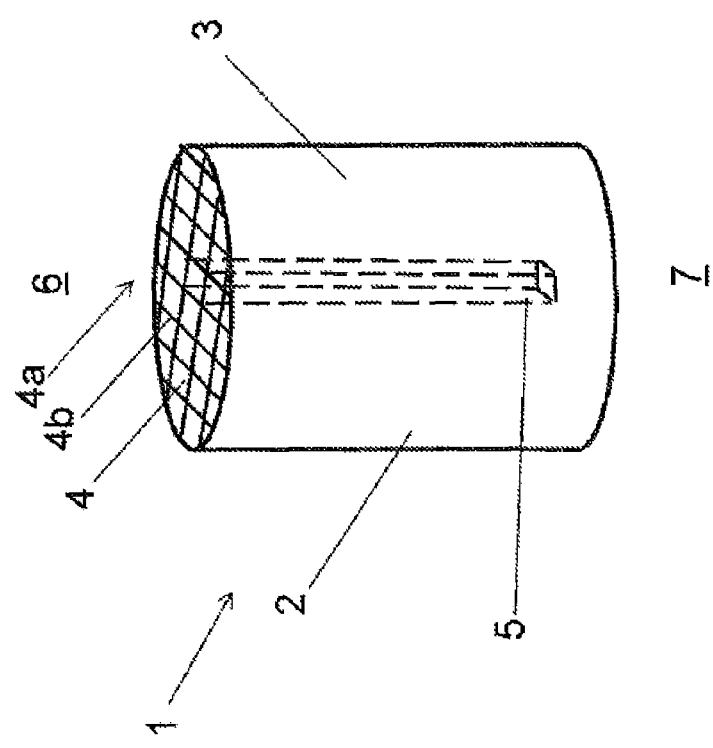
FIG. 2 shows a filter element which has a cylindrical honeycomb body composed of activated carbon, wherein the honeycombs comprise substantially rectangular openings which issue into ducts which run through the honeycomb body.

FIG. 2 shows a filter element 1 comprising a cylindrical body 2 which has material 3 which is suitable for the adsorption of gases and vapors. The body 2 is in the form of a honeycomb body. The honeycombs 4 comprise rectangular openings which issue into ducts 5 which extend through the body 2. Other geometries are conceivable.

Air can flow through the ducts 5 from an inflow side 6 to an outflow side 7, wherein pollutants in the air are adsorbed by the material 3.

The honeycomb body may exhibit adsorption performance as illustrated in FIG. 3. The honeycomb body then exhibits adsorption dynamics such that, at the outflow side of the filter element, a test gas concentration of less than 10 µg/g according to the cyclohexane method in accordance with EN 12941: 1998 is attained in the case of a test duration of 70 minutes measured in accordance with EN 15695-2: 2009.

The honeycomb body has activated carbon. The activated carbon fraction in the honeycomb body is between 50 and 80 percent by weight. In this respect, the material 3 which is suitable for the adsorption of gases and vapors is in the form of activated carbon.

The honeycomb body has ducts 5 formed in it, and the honeycomb body is extended through by ducts 5, which are fully open. The wall thickness 4b of the duct walls is between 200 micrometers and 400 micrometers. The number of ducts 5 in the honeycomb body amounts to between 40 and 100 ducts per square centimeter.

FIG. 3 shows a diagram depicting a breakthrough curve for cyclohexane for a honeycomb body as per FIG. 1 having 93 ducts 5 per square centimeter and having an activated carbon fraction of 65 percent by weight and a wall thickness of 285 µm (600 cells, solid line) in comparison with a breakthrough curve for a honeycomb body having 62 ducts 5 per square centimeter (400 cells, dashed line).

It can be clearly seen that pollutants, specifically the cyclohexane, break through to the outflow side after a shorter time in the case of the honeycomb body having 62 ducts 5 than in the case of the honeycomb body having 93 ducts 5 per square centimeter of inflow area or cross-sectional area 4a.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method of supplying filtered inlet air to an at least partially closed-off chamber, the method comprising:
   contacting inlet air with a filter element, thereby freeing the inlet air from a pollutant comprising an aerosol, gas, liquid droplet, solid particle, or mixture thereof, to obtain a filtered air;
   supplying the filtered air to an at least partially closed-off chamber,
   wherein the filter element comprises a honeycomb body, the honeycomb body comprising activated carbon wherein an activated carbon fraction in the honeycomb body amounts to between 50 and 80 wt %, and
   wherein a wall thickness of duct walls is in a range of from 285 and 400 µm,
   wherein the honeycomb body comprises ducts in a range of from greater than 62 to 100 per square centimeter,
   wherein the honeycomb body has a wall thickness of at least 285 µm,
   wherein the honeycomb body exhibits adsorption dynamics such that, at an outflow side of the filter element, a test gas concentration of less than 10 µg/g according to a cyclohexane method in accordance with EN 12941, from 1998, is attained in a test duration of 70 minutes measured in accordance with EN 15695-2, from 2009.

2. The method of claim 1, wherein the honeycomb body comprises a duct formed in the honeycomb body, or
wherein the honeycomb body comprises a fully open duct extending through the honeycomb body, or
both.

3. The method of claim 1, wherein the honeycomb body comprises 93 ducts per square centimeter,
wherein the honeycomb body has a wall thickness of 285 μm, and
wherein the honeycomb body comprises an activated carbon fraction of 65 wt %.

4. The method of claim 1, wherein the chamber is implemented in an installation in the chemical industry, oil industry or gas industry.

5. The method of claim 1, wherein the chamber is in the form of a cabin of a vehicle.

6. The method of claim 5, wherein the vehicle is an agricultural or forestry vehicle.

7. The method of claim 5, wherein the vehicle is used in construction.

8. The method of claim 5, wherein the vehicle is a passenger motor vehicle or utility motor vehicle.

9. The method of claim 1, wherein the filter element is in the form of a combination filter,
wherein the combination filter comprises a particle-filtering filter stage.

10. The method of claim 1, wherein the filter element is in the form of a combination filter,
wherein the combination filter comprises a dust-filtering filter stage and an aerosol-filtering filter stage.

11. The method of claim 1, wherein the honeycomb body comprises 93 to 100 ducts per square centimeter.

12. The method of claim 1, wherein the honeycomb body has a wall thickness of 285 μm.

13. The method of claim 1, wherein the honeycomb body comprises an activated carbon fraction of 65 wt %.

14. The method of claim 1, wherein the filter element exhibits a pressure loss of less than 50 Pascal at an inflow speed of the inlet air of 0.2 m/s.

15. The method of claim 1, wherein the honeycomb body comprises an activated carbon fraction of at least 65 wt %.

16. The method of claim 1, wherein the honeycomb body comprises more than 62 up to 100 ducts per square centimeter.

17. The method of claim 1, wherein the honeycomb body has a wall thickness of at least 285 μm, and
wherein the honeycomb body comprises an activated carbon fraction of at least 65 wt %.

* * * * *